(12) United States Patent
Sadovsky

(10) Patent No.: US 10,346,455 B2
(45) Date of Patent: Jul. 9, 2019

(54) METHOD AND SYSTEM FOR GENERATING A SUMMARY OF THE DIGITAL CONTENT

(71) Applicant: YANDEX EUROPE AG, Lucerne (CH)

(72) Inventor: Aleksandr Anatolievich Sadovsky, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 7 days.

(21) Appl. No.: 15/699,012

(22) Filed: Sep. 8, 2017

(65) Prior Publication Data
US 2018/0075139 A1     Mar. 15, 2018

(30) Foreign Application Priority Data
Sep. 12, 2016   (RU) ................................ 2016136531

(51) Int. Cl.
| | | |
|---|---|---|
| G10L 25/48 | (2013.01) | |
| G06F 16/34 | (2019.01) | |
| G06N 20/00 | (2019.01) | |
| G06F 17/27 | (2006.01) | |
| G06F 17/22 | (2006.01) | |
| G06N 20/20 | (2019.01) | |

(52) U.S. Cl.
CPC ........ G06F 16/345 (2019.01); G06F 17/2229 (2013.01); G06F 17/2785 (2013.01); G06N 20/00 (2019.01); G06N 20/20 (2019.01)

(58) Field of Classification Search
CPC ............................... G06F 17/271; G10L 25/48
USPC ...................................................... 704/2, 235
See application file for complete search history.

(56) References Cited

U.S. PATENT DOCUMENTS

| | | | | |
|---|---|---|---|---|
| 9,633,005 | B2 * | 4/2017 | Danielyan | G06F 17/271 |
| 10,146,751 | B1 * | 12/2018 | Zhang | G06F 16/313 |
| 2008/0010274 | A1 * | 1/2008 | Carus | G06N 20/00 |
| 2010/0293451 | A1 * | 11/2010 | Carus | G06N 20/00 715/230 |
| 2014/0072285 | A1 * | 3/2014 | Shynar | G11B 27/031 386/286 |
| 2014/0156651 | A1 * | 6/2014 | Rayter | H04N 21/8549 707/723 |
| 2015/0057992 | A1 * | 2/2015 | Danielyan | G06F 17/271 704/2 |

(Continued)

*Primary Examiner* — Seong-Ah A Shin
(74) *Attorney, Agent, or Firm* — BCF LLP

(57) ABSTRACT

There is provided a method and a system for generating a summary of digital content. The method comprises: executing a syntax analysis of a textual representation of the digital content; segmenting the digital content into an ordered set of fragments (i.e. a first fragment and a second fragment); executing a semantic analysis of each fragment of the textual representation; determining a utility parameter for each fragment of the set of fragments; determining a linkage between each pair of fragments of the set of fragments; in response to the utility parameter of the second fragment exceeding a pre-determined threshold value, including the second fragment in a subset of fragments for inclusion in the summary of the digital content; in response to the linkage having been determined between the second fragment and the first fragment, including the first fragment in the subset of fragments; and generating the summary of the digital content.

20 Claims, 6 Drawing Sheets

(56) References Cited

U.S. PATENT DOCUMENTS

2015/0279390 A1* 10/2015 Mani ..................... G10L 25/48
                                                              704/235
2017/0161372 A1*  6/2017 Fern Ndez ........... G06F 17/218
2018/0039644 A1*  2/2018 Bonanni ................ G06F 16/93
2018/0357562 A1* 12/2018 Hofman ................ G06N 20/00

* cited by examiner

METHOD AND SYSTEM FOR GENERATING A SUMMARY OF THE DIGITAL CONTENT

CROSS-REFERENCE

The present application claims priority to Russian Patent Application No. 2016136531, filed Sep. 12, 2016, entitled "Method And System For Generating a Summary of the Digital Content" the entirety of which is incorporated herein.

TECHNICAL FIELD

The present technology relates generally to electronic devices and the methods for processing digital content. More specifically, the present technology relates to systems and methods for generating summaries of the digital content.

BACKGROUND

Advancements in the field of computer technology allow for the processing of high volumes of data, including the computer processing of various kinds of the digital content. The computerized generation of summaries of the digital content is one of the more complex tasks of computer linguistics. The main task of the computerized generation of summaries of the digital content has two aspects: (i) processing speed (insofar as some brief summaries need to be created "on the fly") and (ii) precision (i.e. provision of a brief summary without losing overall meaning).

U.S. patent application no. US20140072285 (pub. 13 Mar. 2014) discloses techniques for summarizing media. A viewer-interaction analyzer receives a media file containing media, the media file including a plurality of segments. A segment of the media file is scored based on interactions of a set of raters. Viewer metrics on the segment of the media file are measured based on interactions with the segment of the media file by a set of viewers. A set of feature vectors are formed based on the measured viewer interactions, where feature vectors in the set of feature vectors are based on interactions of the set of viewers. A model is trained based on the set of feature vectors and the score assigned to the segment of the media file. The model is applied to segments of the media file to generate an interest rating for segments of the media file. An edited media file is generated based on segments of the media file having interest ratings that meet a criterion.

U.S. patent application no. US2015027390 (pub. 1 Oct. 2015) discloses a system and method for the generation of a compressed version of a multimedia content item. Multimedia content item is summarized based on its audio track and a desired compression budget. The audio track is extracted and processed by an automatic speech recognizer to obtain a time-aligned text transcript. The text-transcript is partitioned into a plurality of segment sequences. An informativeness score based on a salience score and a diversity score is computed for each of the segments. A coherence score is also computed for the segments in the plurality of sequences. A subsequence of one of the segment sequences that optimizes for informativeness and coherence is selected for generating a new content item summarizing the multimedia content item.

U.S. patent application No US20140156651 (pub. 5 Jun. 2014) discloses a method for the automatic generation of a compressed version of media content. An automatic summarizing method comprises: receiving from a computerized device a request for summarizing a media content; segmenting the media content into a plurality of segments; wherein an at least one of the plurality of segments is associated with a metadata; wherein said metadata comprising characteristics; ranking a relevancy of each of the plurality of segments; wherein the ranking comprising associating scores to the segments according to the metadata; and selecting an at least one selected segment from said plurality of segments; wherein the at least one selected segment is associated with a highest score from the scores.

SUMMARY

An object of the proposed technology is to expand the arsenal of resources and provide new methods and systems for the summarizing of the digital content. In some of its implementation variants, the non-limiting embodiments of the present technology also make it possible to eliminate some of the deficiencies inherent to the known level of technology.

This technique enables the generation of summaries (abbreviated versions) of the digital content with maximum usability for the user. That said, the summary of the digital content is not pre-limited in terms of length, making it possible to use any number of fragments as required to obtain a useful and coherent summary of the digital content.

In accordance with a first broad aspect of the present technology, there is provided a method for generating a summary of digital content, the method implementable by a processor of a computer-device. The comprises: receiving an indication of the digital content; executing a syntax analysis of a textual representation of the digital content; segmenting the digital content into an ordered set of fragments, including a first fragment and a second fragment; executing a semantic analysis of each fragment of the textual representation of the digital content; determining a utility parameter for each fragment of the set of fragments; determining a linkage between each pair of fragments of the set of fragments; in response to the utility parameter of the second fragment exceeding a pre-determined threshold value of the utility parameter, including the second fragment in a subset of fragments for inclusion in the summary of the digital content; in response to the linkage having been determined between the second fragment and the first fragment, including the first fragment in the subset of fragments; generating the summary of the digital content based on the subset of fragments.

In some implementations of the method, the segmenting of the digital content into an ordered set of fragments comprises executing a pre-trained first machine-learning algorithm.

In some implementations of the method, the method further comprises pre-training the first machine-learning algorithm, the first machine-learning algorithm for segmenting the digital content into the set of fragments, an output of the syntax analysis of the textual representation of the digital content being used as input parameters of the first machine-learning algorithm, and wherein training of the first machine-learning algorithm comprises training using a training sample set.

In some implementations of the method, the determining the utility parameter of each fragment of the set of fragments comprises applying a pre-trained second machine-learning algorithm.

In some implementations of the method, the method further comprises pre-training the second machine-learning algorithm, the second machine-learning algorithm for determining the utility parameter of each fragment from of set of fragments; an output of the semantic analysis of the textual representation of the digital content being used as input parameters of the second machine-learning algorithm, and wherein training of the second machine-learning algorithm comprises training using a training sample set.

In some implementations of the method, the indication of linkage between every two fragments of the set of fragments comprises one of: a parameter indicating an existence of linkage between each two fragments and a parameter indicating a degree of linkage between each two fragments.

In some implementations of the method, the determining the linkage between each pair of fragments from the set of fragments comprises applying a pre-trained third machine-learning algorithm.

In some implementations of the method, the method further comprises training the third machine-learning algorithm, the third machine-learning algorithm for determining the linkage between each pair of fragments from the set of fragments; an output of the semantic and syntax analysis of the textual representation of the digital content being used as input parameters of the third machine-learning algorithm, and the training of the third machine-learning algorithm comprises training using a training sample set.

In some implementations of the method, the determining the linkage between each pair of fragments from the set of fragments, the method further comprising scoring the linkage between at least one pair of fragments from the set of digital-content fragments by an assessor; and wherein the method further comprises using an assessor-score as an additional input parameter of the third machine-learning algorithm.

In some implementations of the method, the determining the linkage between each pair of fragments is performed simultaneously with the segmenting the digital content into an ordered set of fragments.

In some implementations of the method, the utility parameter of the first fragment does not exceed the predefined threshold value.

In some implementations of the method, prior to the defining the utility parameter for each fragment from the set of fragments, the method further comprises determining at least one additional threshold value for the utility parameter; and the method further comprises generating at least one additional summary of the digital content based on at least one additional subset of fragments.

In some implementations of the method, prior to the segmenting the digital content, the method further comprises receiving a request for the generation of summarized digital content.

In some implementations of the method, in response to the receiving the request for the generation of the digital content, the method further comprises transmitting, to an assessor, at least one reference to a fragment of the digital content for the scoring of its utility parameter; and wherein the determining the utility parameter for each fragment of the set of fragments, the method further comprises using the assessor-generated utility-parameter score for at least one of the fragments as an additional input parameter.

In some implementations of the method, the request for the generation of summarized digital content includes the threshold value of the utility parameter of digital-content fragments for inclusion in the summary of the digital content.

In some implementations of the method, the request for the generation of summarized digital content includes an indication of the degree of proficiency in the digital-content subject matter.

In some implementations of the method, the determining the linkage between fragments, the method further comprises using the indication of the degree of proficiency in digital-content subject matter as an input parameter.

In some implementations of the method, the digital content comprises an audio file, and wherein the segmenting the audio file into fragments and the generating indications of linkage between fragments, the method further comprises preforming an analysis of at least one of: intonation, musical accompaniment, voice timbre, voice tempo, voice tone, and pauses.

In some implementations of the method, the digital content comprises a video file, and wherein the segmenting the video file into fragments and the determining the linkage between fragments, the method further comprises performing an analysis of an audio based on at least one: intonation, musical accompaniment, voice timbre, voice tempo, voice tone, pauses, and an analysis of a video based on at least one of: background, scene, and color.

In accordance with another broad aspect of the present technology, there is provided a computer-device for the generation of a summary of a digital content. The computer-device comprises: a processor, a communications interface, the processor functionally coupled to: a digital content receipt module, a digital content segmentation module, a utility parameter determination module, and a fragments linkage determination module. The processor is configured to: receive an indication of the digital content; execute a syntax analysis of a textual representation of the digital content; segment the digital content into an ordered set of fragments, including a first fragment and a second fragment; execute a semantic analysis of each fragment of the textual representation of the digital content; determine a utility parameter for each fragment of the set of fragments; determine a linkage between each pair of fragments of the set of fragments; in response to the utility parameter of the second fragment exceeding a pre-determined threshold value of the utility parameter, include the second fragment in a subset of fragments for inclusion in the summary of the digital content; in response to the linkage having been determined between the second fragment and the first fragment, include the first fragment in the subset of fragments; generate the summary of the digital content based on the subset of fragments.

In the context of this description, unless explicitly indicated otherwise, "electronic device," "computer device," "client device," "server," "remote server" and "computer system" assume the hardware and/or systemware appropriate to solving the corresponding task. Thus, some non-limiting examples of such hardware and/or systemware encompass computers (servers, desktop computers, laptops, netbooks, etc.), smartphones, tablets and network equipment (routers, switches, gateways, etc.) and/or a combination thereof.

In the context of this description, unless explicitly indicated otherwise, "machine-readable media," "repository," "storage device" are understood to mean media of absolutely any kind and nature, with non-limiting examples including RAM, ROM, disks (compact disks, DVD-disks, diskettes, hard disks, etc.), USB keys, thumbdrives, solid-state drives and magnetic-tape drives.

In the context of this description, unless explicitly indicated otherwise, the term "module" is understood to mean software (appropriate to the specific hardware context), as required and sufficient for the performance of (a) specific, directed function(s).

In the context of this description, unless explicitly indicated otherwise, a "reference" to an informational element may be the informational element itself, or a reference, referral, link or other indirect means allowing the receiver of the reference to find the network, memory, database or other machine-readable media from which the informational element can be extracted. For example, a reference to a document might encompass the document itself (i.e. its contents), or it might be a unique descriptor of the document identifying the file in relation to a specific filing system, or another means of transmitting to the user a reference to the network folder, memory address, database table or other location where access to the file can be gained. As will be clear to specialists in this technical field, the level of specificity required for such a reference depends on the level of initial understanding as to how the information exchanged between the receiver and sender of the reference should be interpreted. For example, if it is clear prior to the establishment of a connection between the sender and the receiver that the reference to the informational element is to take the form of a database key to an entry in a specific table of a previously-established database including the informational element, then the transmission of the database key is all that is required for the efficient transmission of the informational element to the user, irrespective of the fact that the informational element itself was not transmitted between the sender and the receiver of the reference.

In the context of this description, unless specifically indicated otherwise, the words "first," "second," "third," etc. are used as adjectives solely for the purposes of distinguishing between the nouns that they describe—not to imply a particular relationship between these nouns. Thus, for example, it should be noted that use of the terms "first server" and "third server" does not imply any particular order, classification as a particular type, chronology, hierarchy or ranking (for example) of servers/between servers, just as their use (in and of itself) does not imply that a certain "second server" must exist in a given situation. Hereinafter, as indicated here and in other contexts, reference to a "first" element and "second" element does not exclude the possibility that it is actually the same element. Thus, for example, in certain situations, the "first" server and "second" server may be one and the same software and/or hardware, and in other situations they may be different software and/or hardware.

In the context of the non-limiting embodiments of the present technology, the term "utility parameter of a digital-content fragment" is understood to mean an expression of the level of interest, importance and informativeness of the digital-content fragment for the user. In a video of a lecture, for example, the fragment with the introduction and fragment with the conclusions are usually of greater utility to the user than fragments in which the speaker digresses from the main topic in order to attract the audience's attention (begins telling anecdotes, for example).

In the context of the non-limiting embodiments of the present technology, the terms "fragment interrelationship," "fragment linkage," "fragment link" are understood to mean the comprehensibility to the user of one fragment under the exclusion of another fragment. For example, the first digital-content fragment might give a description of a study question, while the second fragment gives the answer to it. In this case, the second fragment would be incomprehensible without the first, related fragment. That said, the first fragment might be comprehensible without the second fragment.

The additional and/or alternate characteristics, aspects and advantages of the variants for implementing this technology will become evident from the following description, attached diagrams and attached invention claim.

BRIEF DESCRIPTION OF THE DRAWINGS

For the better understanding of the technology disclosed herein, as well as its other aspects and intrinsic features, reference is made to the following description, which should be used in combination with the attached diagrams, where.

DETAILED DESCRIPTION

Figure 1:
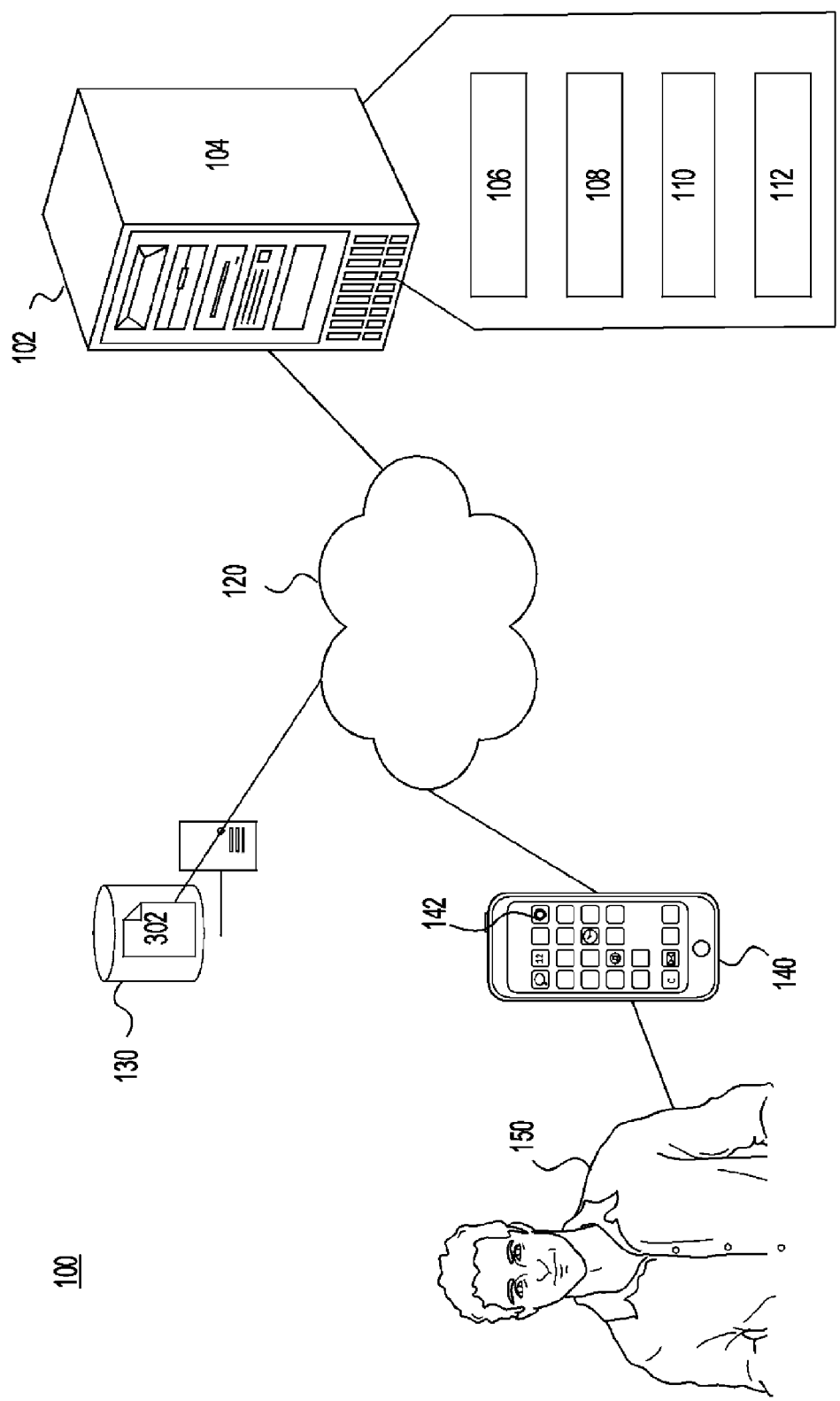
FIG. 1 depicts a schematic diagram of a system implemented according to non-limiting embodiments of the present technology.

FIG. 1 illustrates a system 100 in accordance with one implementation of the present technology. It is to be expressly understood that the system 100 is merely one possible implementation of the present technology. Thus, the description thereof that follows is intended to be only a description of illustrative examples of the present technology. This description is not intended to define the scope or set forth the bounds of the present technology. In some cases, what are believed to be helpful examples of modifications to system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances a simple implementation of the present technology, and that where such is the case they have been presented in this manner as an aid to understanding. As persons skilled in the art would understand, various implementations of the present technology may be of a greater complexity.

With reference to FIG. 1, the system 100 comprises a computer-device 102, connected via a data-transmission network 120 to at least one of the digital content source server 130 and at least one client device 140, associated with a user 150. The computer-device 102 comprises a processor 104, a communications interface (not shown), the processor 104 functionally linked to a module 106 for the receipt of the digital content, a digital content segmentation module 108 into an ordered set of fragments, a module 110 for the determination of a utility parameter and a fragments linkage determination module 112. In some non-limiting embodiments of the present technology, the data-transmission network 120 can be the Internet. In other non-limiting embodiments of the present technology, the data-transmission network 120 can be implemented differently—in the form of a wide-area communications network, local-communications network, private-communications network, etc.

According to the non-limiting embodiments of the present technology, the system 100 depicted in FIG. 1, modules 106, 108, 110 and 112 form part of the computer-device 102. However, other non-limiting embodiments of the system 100 are possible wherein at least one of the modules 106, 108, 110, 112 does not form part of the computer-device 102, but rather, for example, is implemented as a separate server (not shown) and connected to the computer-device 102 via the data-transmission network 120. Thus, precisely how the processor 104 of the computer-device 102 is functionally connected to the modules 106, 108, 110 and 112 is not particularly limiting. The processor 104 is configured to perform the various operations described below, using the modules 106, 108, 110, and 112.

The computer-device 102 can be a regular computer server, such as the server Dell™ PowerEdge™ running the operating system Microsoft™ Windows Server™. It is important to bear in mind that the computer-device 102 can be implemented on any suitable hardware and/or applied software and/or systemware or a combination thereof. In the presented non-limiting embodiments of the present technology the computer-device 102 is a single server. In other non-limiting embodiments of the present technology, the processing functionality of computer-device 102 may be distributed, and can be implemented with the aid of several computer-devices.

Various implementations of the communications interface (not shown) are well known to those of skill in the art. The exact manner by which the computer-device 102 is connected to the digital content source server 130 and the client device 140 is in no way specifically limited. As an example, but not a limitation, the computer-device 102 may be connected to the digital content source server 130 by a wired data-transmission network (Ethernet-based connection). The computer-device 102 may be connected to at least one client device 140 by a wireless communications network (such as, among others, the 3G network, the 4G network, the wireless Internet Wireless Fidelity or WiFi®, Bluetooth®, etc.). An alternate or additional computer-device 102 may be connected to the digital content source server 130, client device 140 with the use of a wired or wireless data-transmission network or a combination thereof.

The digital content source server 130 can be a regular computer server, such as the server Dell™ PowerEdge™ running the operating system Microsoft™ Windows Server™. It is important to bear in mind that the digital content source server 130 can be implemented on any suitable hardware and/or applied software and/or systemware or a combination thereof. In some non-limiting embodiments of the present technology, the digital content source server 130 is a single server. In some non-limiting embodiments of the present technology, the functionality of the digital content source server 130 can be divided, and can be implemented with the aid of several servers. It is important to bear in mind that the digital content source server 130 and computer-device 102 need not be implemented identically.

The digital content source server 130 provides digital content, including one or more digital documents 302. The nature of one or more digital documents 302 is in no way specifically limited. Thus, the digital document 302 can feature the use of various kinds of the digital content, in particular: text file, audio file, video file. The digital document 302 could be, for example, a video lecture "Analysis of Continuous Systems" by Professor K. J. Bathe. Another non-limiting example of the digital document 302 could be a webpage containing text (for example, a WIKIPEDIA™ entry on data-centers). The digital document 302 could be, as another example, an audio book. For example, the audio book of "Pride and Prejudice" by Jane Austen.

In some embodiments of the present technology, the computer-device 102 additionally comprises a data storage (not shown) storing digital content (in particular, the digital document 302). Thus, the digital content source server 130 and the computer-device 102, in certain non-limiting embodiments of the present technology, may be a single device.

Irrespective of the type and content of the digital document 302, it may be desirable to generate a summary of the digital document 302. The variants for the use of such a summary are innumerable. For example, it may be desirable to generate a summary of the digital document 302 representing a web resource for the inclusion of such a generated summary on the search engine results page (SERP) generated by a search engine server in response to a user's search query. As another example, it may be desirable to generate a summary of the digital document 302 representing a video or audio file to reduce traffic on the data-transmission network 120 while maintaining the quality of the content and its basic meaning. That said, the generation of summaries of the digital content also enables increasing the speed of the user's familiarization with the digital content, and consequently, to significantly decrease data-transmission network traffic and the load on the digital content source server 130.

Irrespective of the reason why such summary of the digital content may be desirable, the system 100 comprises a client device 140. The client device 140 is configured to access the digital content source server 130 and/or the computer-device 102 via the data-transmission network 120. Client device 140 is capable of gaining access to the digital content source server 130 and/or computer-device 102 or of accessing the contents of one or more digital documents 302, or of accessing their generated summaries. For this purpose, client device 140 is connected to data-transmission network 120 by data-transmission line (not enumerated).

The hardware implementation of client device 140 is in no way specifically limited. The client device 140 can, by way of a non-limiting example, be a desktop computer, a laptop or a smartphone, as shown in FIG. 1 (e.g. the Apple iPhone™ or Samsung Galaxy S5™), a personal digital assistant (PDA) or other device that comprises computing functionality and data-transmission capability. The client device 140 can comprise, among other things, internal hardware components, including one or more single or multitier processors, collectively represented here as the processor (not shown), RAM (not shown) and network interface (not shown) for connecting to the digital content source server 130.

Implementation of the data-transmission line is not limited, and will depend on which client device 140 is being used. As an example (but not a limitation) in cases where the client device 140 is a wireless communications device (such as a smartphone), the data-transmission line is a wireless data-transmission network (such as a 3G data-transmission line, a 4G data-transmission line, wireless Internet Wireless Fidelity or WiFi®, Bluetooth® etc.). In those examples where client device 140 is a portable computer, the data-transmission line can be either wireless (wireless Internet Wireless Fidelity or WiFi®, Bluetooth® etc.) or wired (connection based on the Ethernet).

The client device 140 is associated with the user 150, who can interact with the client device 140. In certain non-limiting embodiments of the present technology, the client device 140 can be implemented with the capability of executing a browser application (not shown). Generally speaking, the task of the browser application is to provide the user 150 with access to one or more web resources and/or to one or more services. One or more web resources and/or one or more services can be stored or provided by the computer-device 102 and/or the digital content source server 130.

The implementation of the browser application is in no way specifically limited. For example, the browser application 142 can be implemented as the Yandex™ browser. Despite the fact that the client device 140 is associated with the user 150, this does not necessitate (but may include) authorization from user 150 or anything of the sort.

It is important to note that the various embodiments of the client device 140, the data-transmission line and the data transmission network 120 are provided solely for illustrative purposes. Thus, those skilled in the art will be able to appreciate the details of the other implementations for the implementation of the client device 140, the data-transmission line and the data-transmission network 120. For example, in other non-limiting embodiments of the present technology, In some non-limiting embodiments of the present technology the computer-device 102 can be configured to receive a request from client device 140 for the generation of a summary of the digital content.

With reference to FIG. 1, the computer-device 102 comprises a digital content receipt module 106. In this context, the digital content receipt module 106 can be a physical device, an apparatus or a suite of modules implemented using hardware, such as with the aid of an application-specific integrated circuit (ASIC) or a field-programmable gate array (FPGA), or even with a combination of hardware and software, such as a microprocessor system and an array of instructions supporting the functionality of the module, which (when executed) transform the microprocessor system into a special-purpose device. The digital content receipt module 106 can also be implemented as a combination of hardware and software; that said, some specific functions are implemented with the support of hardware, while other functions are implemented by a combination of hardware and software.

In other non-limiting embodiments of the present technology, the digital content receipt module 106 can also be implemented as software for implementation by various kinds of processors. The digital content receipt module 106 may, for example, include one or more physical or logical blocks of computer instructions, which could be organized, for example, as an object, a procedure or a function. However, these executable modules do not have to be physically situated together, and they may encompass various instructions contained in different places which, when logically connected to one another, include the aforementioned module and complete the assigned task for that module.

The digital content receipt module 106 may receive a reference to digital content and/or the digital content itself (in particular, digital document 302 and/or a reference thereto) from the digital content source server 130 via data-transmission network 120 and/or from client device 140.

In certain non-limiting embodiments of the present technology, wherein digital document 302 is not in text format, the digital content receipt module 106 may additionally receive the text representation of the digital content (digital document 302). Thus, for example, if the digital document 302 includes a video lecture, of the digital document 302 the digital content source server 130 may additionally store the textual representation (transcript) of the digital document 302. The digital content receipt module 106 may additionally be configured to generate the digital document 302, constituting an audio file, video file or image. Thus, the digital content receipt module 106 may comprise machine-readable instructions, which instructions when executed cause the processor 104 of the computer-device 102 to execute speech- and/or image-recognition for the generation of a textual representation of the digital content, in particular—the digital document 302. Speech-recognition algorithms are well known in this technical field; as an example, however, such an algorithm could be implemented by way of a deep neural network, which makes it possible to take into account a plurality of interrelated speech attributes. The implementation of a deep neural network is in no way specifically limited.

With reference to FIG. 1, the computer-device 102 comprises a digital content segmentation module 108. In this context, the digital content segmentation module 108 can be a physical device, an apparatus or a suite of modules implemented using hardware, such as with the aid of an application-specific integrated circuit (ASIC) or a field-programmable gate array (FPGA), or even with a combination of hardware and software, such as using a microprocessor system and an array of instructions supporting the functionality of the module, which (when executed) transform the microprocessor system into a special-purpose device. The digital content segmentation module 108 can also be implemented as a combination of hardware and software; that said, some specific functions can be implemented with the support of hardware, while other functions can be implemented by a combination of hardware and software.

In other non-limiting embodiments of the present technology, the digital content segmentation module 108 can also be implemented as software for implementation by various kinds of processors. The digital content segmentation module 108 may, for example, include one or more physical or logical blocks of computer instructions, which could be organized, for example, as an object, procedure or function. However, these executable modules do not have to be physically situated together, and they may encompass various instructions contained in different places which, when logically connected to one another, include the aforementioned module and complete the assigned task for that module.

Figure 3:
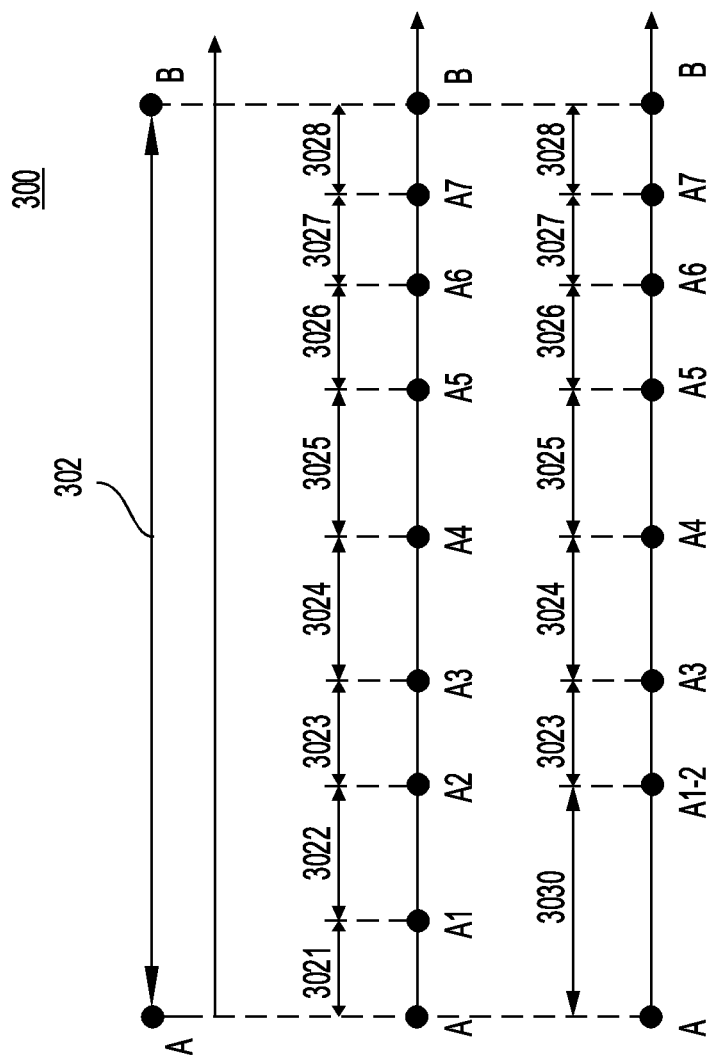
FIG. 3 depicts a schematic of a process for generation of summarized digital content based on a subset of fragments in accordance with non-limiting embodiments of the present technology.

With reference to FIG. 1 and FIG. 3, the digital content segmentation module 108 is configured to perform syntax analysis (parsing) of the textual representation of the digital content (in particular, the digital document 302). At least on the basis of the syntax analysis of the textual representation of the digital content, the digital content segmentation module 108 is configured to segment the digital content (the digital document 302) into an ordered set of fragments comprising a first fragment 3021 and a second fragment 3022. In some embodiments of the present technology, the size of the first fragment 3021 and the second fragment 3022 can be the same. In other non-limiting embodiments of the present technology, the size of the first fragment 3021 can be different from the size of the second fragment 3022.

In some non-limiting embodiments of the present technology, the ordered set of fragments includes at least three fragments: the first fragment 3021, the second fragment 3022 and a third fragment 3023. As shown in the illustrated example in FIG. 3, the ordered set of fragments may comprise a larger number of fragments, in particular: 8 fragments (enumerated at 3021, 3022, 3023, 3024, 3025, 3026, 3027, 3028). It should be noted that the number and size of the fragments for which the processor 104, by way of the digital content segmentation module 108, performs the segmentation of the digital content, is not particularly limited. Thus, for example, the digital document 302 may be segmented into 8 fragments as shown in FIG. 3, or, for example, into 100 fragments (not shown) or into just 3 fragments (not shown).

Moreover, the digital content segmentation module 108 may be configured to analyze the audio representation of the digital content and determine, in particular: intonation, musical accompaniment, voice timbre, voice tempo, voice tone, pauses, etc. The digital content segmentation module 108 may also be configured to analyze the visual representation of the digital content and determine, in particular: background, scene, color, the capability of image recognition, etc.

In some non-limiting embodiments of the present technology, the digital content segmentation module 108 is configured to segment the digital content into an ordered set of fragments at least partially on the basis of the pre-trained first machine-learning algorithm. In some non-limiting embodiments of the present technology the first machine-learning algorithm has been pre-trained to segment content into a set of fragments; that said, the data of the parsing (syntax analysis) of the textual representation of the digital content is pre-set as the input parameters of the first machine-learning algorithm, and training of the first machine-learning algorithm comprises training with a trainer based on a training sample set. The results of the analysis of the audio and/or visual representation of the digital content may be pre-set as additional input parameters for the first machine-learning algorithm.

In some non-limiting embodiments of the present technology when the digital document 302 is an audio or video file, the digital content segmentation module 108 is configured to execute an additional analysis of the audio representation of the digital content based on at least one of the following: intonation, musical accompaniment, voice timbre, voice tempo, voice tone, pauses. That said, the first machine-learning algorithm can be additionally pre-trained to segment digital content into a set of fragments based on the analysis of the audio representation of the digital content.

For instance, in the event that the digital document 302 is an audio book, a particular role under the segmentation of the digital content into an ordered set of fragments may be played by the audio representation of the digital content, in particular—the existence of pauses and their length between sentences, a change in the characteristics of the speaker's voice, etc.

In some non-limiting embodiments of the present technology, if the In some non-limiting embodiments of the present technology, the digital document 302 is a video file, the digital content segmentation module 108 is configured to execute an additional analysis of the visual representation of the digital content based on at least one of the following: background, scene, color, etc. That said, the first machine-learning algorithm can be additionally pre-trained to segment digital content into a set of fragments based on the analysis of the visual representation of the digital content.

For instance, in the event that digital document 302 is a video lecture, a particular role under the segmentation of the digital content into an ordered set of fragments may be played by the visual representation of the digital content, in particular—the changes in the scene (speaker at the chalkboard, speaker, audience, chalkboard, etc.).

With reference to FIG. 1, the computer-device 102 comprises a utility parameter determination module 110. In this context, the utility parameter determination module 110 can be a physical device, an apparatus or a suite of modules implemented using hardware, such as with the aid of an application-specific integrated circuit (ASIC) or a field-programmable gate array (FPGA), or even with a combination of hardware and software, such as with the aid of a microprocessor system and an array of instructions supporting the functionality of the module, which (when executed) transform the microprocessor system into a special-purpose device. The utility parameter determination module 110 can also be implemented as a combination of hardware and software; that said, some specific functions can be implemented with the support of hardware, while other functions can be implemented by a combination of hardware and software.

In some non-limiting embodiments of the present technology, the utility parameter determination module 110 can also be implemented as a software for implementation by various kinds of processors. The utility parameter determination module 110 may, for example, include one or more physical or logical blocks of computer instructions, which could be organized, for example, as an object, procedure or function. However, these executable modules need not but may be physically situated together, and they may encompass various instructions contained in different places which, when logically connected to one another, include the aforementioned module and complete the assigned task for that module.

The utility parameter determination module 110 is configured to execute a semantic analysis of the textual representation of the digital content (in particular—the digital document 302). At least on the basis of the semantic analysis of the textual representation of the digital content, the utility parameter determination module 110 is configured to determine a utility parameter for each fragment from the set of fragments.

In some non-limiting embodiments of the present technology the utility parameter determination module 110 is configured to determine the utility parameter for each fragment from the set of fragments at least partially on the basis of the pre-trained second machine-learning algorithm. In some non-limiting embodiments of the present technology the second machine-learning algorithm has been pre-trained to perform the determination of the utility parameter for each fragment from the set of fragments; that said, the data of the semantic analysis of the textual representation of each fragment of the digital content are pre-set as the input parameters of the second machine-learning algorithm, and training of the second machine-learning algorithm comprises training with a trainer based on a training sample set.

In some non-limiting embodiments of the present technology wherein the digital document 302 is an audio or video file, the utility parameter determination module 110 is configured to execute an additional analysis of the audio representation of the digital content based on at least one of the following: intonation, musical accompaniment, voice timbre, voice tone, voice tempo, pauses. That said, the second machine-learning algorithm can be additionally pre-trained to determine the utility parameter of each fragment from the set of fragments based on the analysis of the audio representation of the digital content.

For instance, in the event that digital document 302 is an audio book, a particular role under determination of the utility parameter of each fragment from the set of fragments of the digital content may be played by the audio representation of the digital content, in particular—the speaker's intonation, rising tone, the existence of pauses and their length, etc. For example, a pause may serve to emphasize the most important word in a sentence.

For instance, in cases where digital document 302 is a video lecture, a certain role in determining the utility parameter of each fragment from the set of fragments may be played by repetitions, intensification of the speaker's voice, pauses, a slowing of pace in the utterance of the most important fragments, etc. For example, the speaker may read the most important sentences more slowly.

In some non-limiting embodiments of the present technology wherein the digital document 302 is a video file, the utility parameter determination module 110 is configured to perform the additional analysis of the visual representation of the digital content based on at least one of the following: background, scene, color, images, etc. That said, the second machine-learning algorithm is additionally pre-trained to determine the utility parameter of fragments based on the analysis of the visual representation of the digital content.

For instance, in the event that digital document 302 is a video-lecture, a particular role under determination of the utility parameter of each fragment from the set of fragments may be played by the visual representation of the digital content, in particular—a wide-shot of the chalkboard or slide of the presentation.

In some non-limiting embodiments of the present technology wherein, at the step of determining the utility parameter, the utility of at least one fragment from the set of fragments is scored by an assessor; that said, the score received from the assessor can be applied as an additional input parameter of the second machine-learning algorithm. Thus, the processor 104, by way of the utility parameter determination module 110, is configured to send at least one fragment from the set of fragments of the digital document 302 to the human assessor for the scoring of the utility of the given fragment. The score received from the assessor may be used as an additional input parameter of the second machine-learning algorithm to determine the utility of each fragment from the set of fragments of the digital document 302 and/or other digital content.

With reference to FIG. 1, the computer-device 102 comprises a fragments linkage determination module 112. In this context, the fragments linkage determination module 112 can be a physical device, an apparatus or a suite of modules implemented with the use of hardware, such as using an application-specific integrated circuit (ASIC) or a field-programmable gate array (FPGA), or even with a combination of hardware and software, such as with the aid of a microprocessor system and an array of instructions supporting the functionality of the module, which (when executed) transform the microprocessor system into a special-purpose device. The fragments linkage determination module 112 can also be implemented as a combination of hardware and software; that said, some specific functions can be implemented with the support of hardware, while other functions can be implemented by a combination of hardware and software.

In some non-limiting embodiments of the present technology, the fragments linkage determination module 112 can also be implemented as software for implementation by various kinds of processors. The fragments linkage determination module 112 may, for example, include one or more physical or logical blocks of computer instructions, which could be organized, for example, as an object, procedure or function. However, these executable modules need not be physically situated together, and they may encompass various instructions contained in different places which, when logically connected to one another, include the aforementioned module and complete the assigned task for that module.

The fragments linkage determination module 112 is configured to determine the linkage between each pair of fragments from the set of fragments, at least on the basis of the syntax (parsing) and semantic analysis of the textual representation of the digital content.

In some non-limiting embodiments of the present technology the fragments linkage determination module 112 is configured to determine the linkage between each pair of fragments from the set of fragments at least partially on the basis of a pre-trained third machine-learning algorithm. In some non-limiting embodiments of the present technology, the third machine-learning algorithm has been pre-trained to determine the linkage between fragments; that said, the data of the syntax and semantic analysis of the textual representation of each fragment of the digital content are pre-set as the input parameters of the third machine-learning algorithm, and training of the third machine-learning algorithm entails training with a trainer based on a training sample set.

In some non-limiting embodiments of the present technology, wherein digital document 302 is an audio or video file, the fragments linkage determination module 112 is further configured to execute an additional analysis of the audio representation of the digital content based on at least one of the following: intonation, musical accompaniment, voice timbre, voice tempo, voice tone, pauses. That said, the third machine-learning algorithm can be additionally pre-trained to determine the linkage between each pair of fragments from the set of fragments based on the analysis of the audio representation of the digital content.

For instance, in the event that digital document 302 is an audio book, a particular role under determination of the linkage between fragments from the set of fragments of the digital content may be played by the audio representation of the digital content, in particular—the speaker's voice, musical accompaniment, the speaker's intonation, rising tone, the existence of pauses and their length, etc.

For example, in the event that digital document 302 is a video lecture, a particular role under determination of the linkage between each two fragments from the set of fragments may be played by the changes in voices (dialog) and the speaker's intonation. In the event that digital document 302 is a movie, a particular role under determination of the linkage between fragments may be played by the musical accompaniment, the voices of the actors, their timbre, tone and intonation. For example, the repetitiveness of the musical accompaniment and/or the repetitiveness of the voices could signify the continuation of one of the movie's story arcs and the interlinkage between the fragments.

In some non-limiting embodiments of the present technology, wherein digital document 302 is a video file, the fragments linkage determination module 112 is further configured to perform the additional analysis of the visual representation of the digital content based on at least one of the following: background, scene, color, images, etc. That said, the third machine-learning algorithm is additionally pre-trained to determine the linkage between each pair of fragments from the set of fragments based on an analysis of the visual representation of the digital content.

In some non-limiting embodiments of the present technology, wherein, at the step of determining the linkage between each pair of fragments from the set of fragments, the linkage between at least one pair of fragments from the set of the digital content fragments is scored by an assessor; that said, the score received from the assessor is applied as an additional input parameter of the third machine-learning algorithm. Thus, processor 104, by way of the module for determining the linkage between fragments, is further configured to send at least one pair of fragments from the set of fragments of the digital document 302 to the human assessor for scoring the linkage between each pair of fragments, for example, between second fragment 3022 and first fragment 3021. The score received from the assessor may be used as an additional input parameter of the third machine-learning algorithm to determine the linkage between each pair of fragments from the set of fragments of the digital document 302 and/or other digital content.

For instance, in the event that digital document 302 is a movie, a particular role under determination of the linkage between fragments from the set of fragments may be played by the visual representation of the digital content, in particular—the repetition of images or scenes. For example, the depiction of one and the same object in the shot could signify linkage between certain fragments.

It should be noted that the examples listed above referencing an audio book, a video lecture and a movie are provided for illustrative purposes only, and are not limiting with respect to the non-limiting embodiments of the present technology—they are intended solely for ease of understanding. The first, second and third machine-learning algorithms can be trained to determine content category and account for the various parameters typical of the given content category. That said, the same characteristics of different content categories may signify the opposite. In the case of a movie, for example, the repetitiveness of a scene would probably indicate linkage between certain fragments (the continuation of a particular story line), while in the case of a video lecture, slight changes in scene would be typical and their repetition would not necessarily indicate linkage between particular fragments. For a movie, the most dynamic scenes with loud soundtracks could indicate the high utility of the fragment, while for a video lecture, on the contrary, a dynamic scene and the presence of noise could indicate low utility (students entering the auditorium, speaker doing a microphone check, wiping the chalkboard, etc.).

Figure 2:
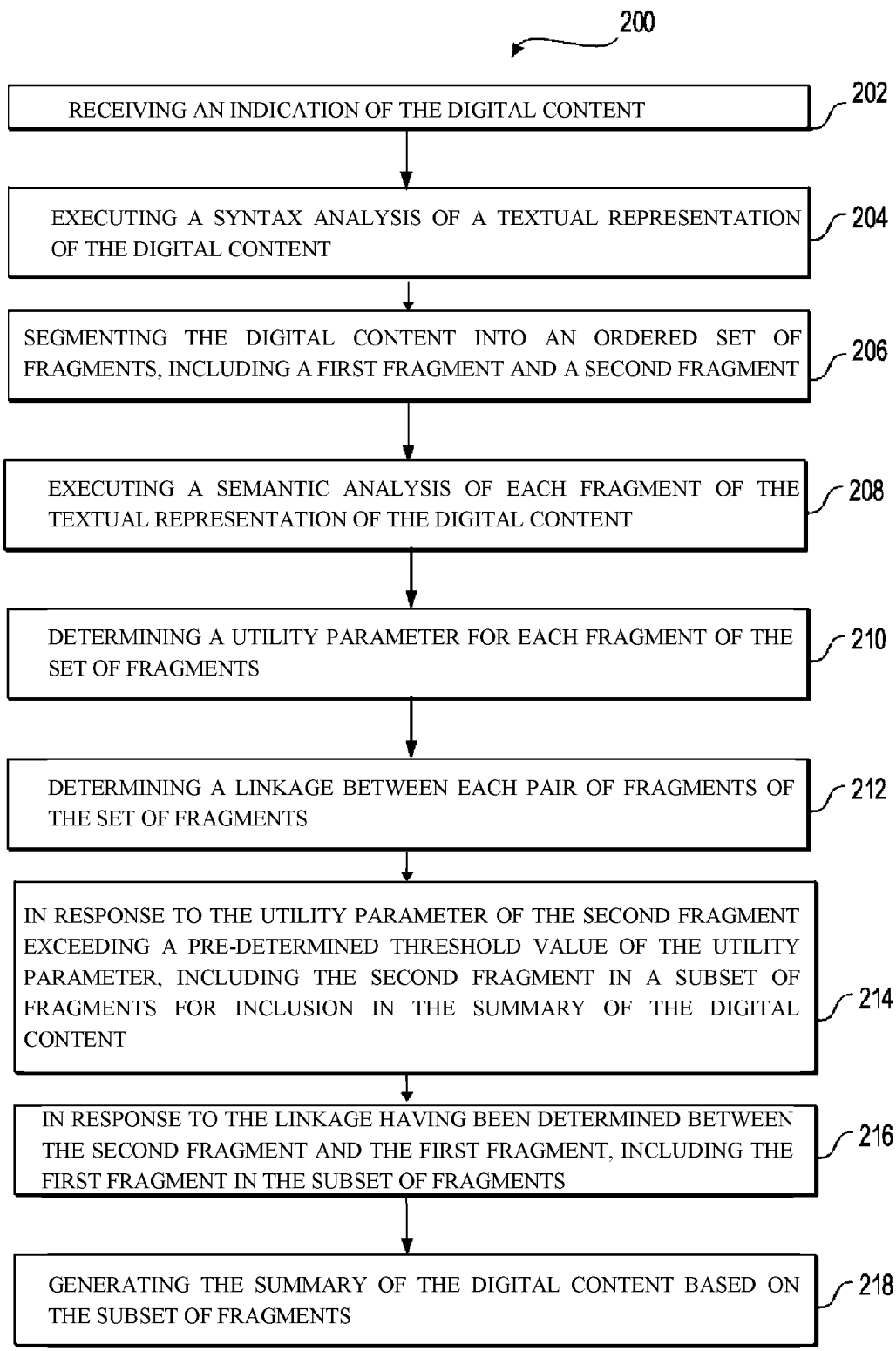
FIG. 2 depicts a flowchart of a method, the method executable by the system depicted in FIG. 1 and being implemented in accordance with non-limiting embodiments of the present technology.

FIG. 2 depicts the flowchart of a method 200, the method 200 being implemented within the system 100, as depicted in FIG. 1, and executed in accordance with the non-limiting embodiments of the present technology.

Step 202—Receiving an Indication of the Digital Content

The method 200 starts at step 202, where computer-device 102 receives an indication of the digital document 302 from the digital content source server 130.

In some non-limiting embodiments of the present technology, the computer-device 102 receives the indication of the digital document 302 from the client device 140.

If the digital document 302 is an audio file, video file or image, the digital content receipt module 106 additionally executes receiving of the textual representation of the digital document 302 from the digital content source server 130 or from client device 140. If the textual representation of the digital document 302 is unavailable, the digital content receipt module 106 executes the generation of the textual representation of the digital document 302.

Then, the method continues to step 204.

Step 204—Executing a Syntax Analysis of a Textual Representation of the Digital Content At step 204, the computer-device 102 executes the syntax analysis (parsing) of the textual representation of the digital document 302 by way of the digital content segmentation module 108.

In some non-limiting embodiments of the present technology, the digital content segmentation module 108 performs the analysis of the audio and/or visual representation of the digital document 302. That said, various audio and visual effects can be flagged in the textual representation of the digital document 302. For example, in the event that digital document 302 is a video lecture, the fragment in which the speaker slows his speaking pace is correlated with the sentence he's uttering and flagged in the textual representation. Similarly, a change of scene, such as a transition from the master shot to a shot of the chalkboard, is also correlated with the textual and/or audio representation and then flagged in the textual representation of the digital document. The following are non-limiting examples of sound effects: intonation, musical accompaniment, voice timbre, voice tempo, voice tone, pauses. The following are non-limiting examples of visual effects: background, scene, color.

Then, the method continues to step 206.

Step 206—Segmenting the Digital Content into an Ordered Set of Fragments, Including a First Fragment and a Second Fragment Step 206 will be described with reference to FIG. 2 and FIG. 3. At step 206, the computer-device 102, by way of the digital content segmentation module 108 and based on the syntax analysis of the textual representation of the digital document 302, performs the segmentation of the digital document 302 into an ordered set of fragments encompassing first fragment 3021 and second fragment 3022.

In some non-limiting embodiments of the present technology, at step 206, the segmentation of the digital document 302 into an ordered set of fragments is additionally performed based on an analysis of the audio and/or visual representation of the digital document 302.

In some non-limiting embodiments of the present technology, the segmenting of the digital content into an ordered set of fragments is executed at least partially using the pre-trained first machine-learning algorithm. Additionally, the segmentation of the digital document 302 can be performed with the participation of assessors for the purposes of verification and the follow-up training of the first machine-learning algorithm.

In some non-limiting embodiments of the present technology, the size of the first fragment 3021 is not equal to the size of the second fragment 3022.

In some non-limiting embodiments of the present technology, the ordered set of fragments includes at least three fragments: a first fragment 3021, a second fragment 3022 and a third fragment 3023.

As shown in the illustrated example in FIG. 3, the digital document 302 is segmented into an ordered set of fragments that includes eight fragments (enumerated at 3021, 3022, 3023, 3024, 3025, 3026, 3027, 3028). In other non-limiting embodiments of the present technology, the digital content can be segmented into a higher or lower number of fragments.

Then, the method continues to step 208.

Step 208—Executing a Semantic Analysis of Each Fragment of the Textual Representation of the Digital Content At step 208, the computer-device 102, by way of the utility parameter determination module 110, performs the semantic (meaning) analysis of each fragment of the textual representation of the digital document 302. The performance of semantic analysis may involve the use of various algorithms, such as an algorithm for the detection of semantic dependencies using basic semantic templates, algorithms based on rules describing all of the possible variants for the use of a particular lexical unit in text; algorithms based on statistics (with the use of machine-learning); mixed algorithms employing both statistical methodologies and dictionaries, etc.

Then, the method continues to step 210.

Step 210—Determining a Utility Parameter for Each Fragment of the Set of Fragments Step 210 will be described with reference to FIG. 4. At step 210, the computer-device 102, by way of the utility parameter determination module 110 and based on the results of semantic analysis, determines the utility parameter of each fragment from the ordered set of fragments of the digital document 302.

In some non-limiting embodiments of the present technology, the utility parameter of each fragment from the set of fragments is determined at least partially using the pre-trained second machine-learning algorithm. The second machine-learning algorithm has been pre-trained to determine the utility parameter of each fragment from the set of fragments; that said, the data of the semantic analysis of the textual representation of the digital document 302 are pre-set as the input parameters of the second machine-learning algorithm, and training of the second machine-learning algorithm entails training with a trainer based on a learning sample.

Additionally, determination of the utility parameter of at least one of the fragments of the digital document 302 can be performed with the participation of assessors for the purposes of verification and the follow-up training of the second machine-learning algorithm. Thus, for example, a group of assessors may be shown at least one fragment from the set of fragments (3021-3028) of the digital document 302. Thereafter, the average utility score for at least one fragment, as given by the assessors, is compared with the score received by way of the second machine-learning algorithm.

Thus, a utility parameter may be determined for each fragment from the set of fragments 3021-3028 of the digital document 302. As shown in FIG. 4, the utility parameter of each of the fragments 3021-3028 is determined in the range of from 0 to 1. That said, the greatest nominal utility to the user corresponds to 1, and the least—to 0. In the illustrated example in FIG. 4, the greatest utility is provided by second fragment 3022 and seventh fragment 3027. That said, first fragment 3021 has the least utility among all of the remaining fragments of the digital document 302.

In some non-limiting embodiments of the present technology, in response to receiving a request for the generation of the digital content, the assessor is sent at least one reference to a fragment of the digital content for the scoring of its utility parameter; at the step of determining the utility parameter for each fragment from the set of fragments, the aforementioned received utility-parameter score for at least one of the fragments is used as an additional input parameter. Upon the receipt of a request for the generation of a summary of the digital content from client device 140, an implementation variant is possible, wherein user 150, having sent the request from client device 140, is used as the assessor. Thus, the utility parameter score of at least one of the fragments may be received from user 150, that is—the utility of the remaining fragments will be determined with account for the utility score for the specific user 150.

In some non-limiting embodiments of the present technology, the request for the generation of summarized digital content includes a threshold value of the utility parameter of the digital-content fragments for inclusion in the summary of the digital content. The threshold value may be pre-set prior to the implementation of this method. FIG. 4 depicts threshold value 402 and additional threshold value 404. Depending on the size of the threshold value, the summary of the digital content may include a different number of fragments of the digital document 302.

Then, the method continues to step 212.

Step 212—Determining a Linkage Between Each Pair of Fragments of the Set of Fragments Step 212 will be described with reference to FIG. 5. At step 212, the processor 104 of computer-device 102, by way of the fragments linkage determination module 112 and on the basis of the semantic and syntax analysis of the textual representation of the digital document 302, performs the determination of linkage between each pair of fragments from the set of fragments 3021-3028 of the digital document 302. The determination of linkage between each pair is understood to mean the determination of linkage between the first fragment 3021 and the second fragment 3022; the first fragment 3021 and the third fragment 3023, the second fragment 3022 and the first fragment 3021, the second fragment 3022 and the third fragment 3023, etc. Put another way, the processor 104 executes the comparison of each fragment with every other fragment.

In some non-limiting embodiments of the present technology, the linkage between each pair of fragments is additionally determined based on an analysis of the audio and/or visual representation of the digital document 302.

In some non-limiting embodiments of the present technology, the determination of linkage between each pair of fragments from the set of fragments is at least partially based on the pre-trained third machine-learning algorithm.

In some non-limiting embodiments of the present technology, the third machine-learning algorithm has been pre-trained to determine the linkage between each pair of fragments from the set of fragments; that said, the data of the semantic and syntax (parsing) analysis of the textual representation of the digital content are pre-set as the input parameters of the third machine-learning algorithm, and training of the third machine-learning algorithm entails training with a trainer based on a learning sample. The analytical data of the audio and/or visual representation of the digital document 302 may be used as additional input parameters for the third machine-learning algorithm.

Figure 5:
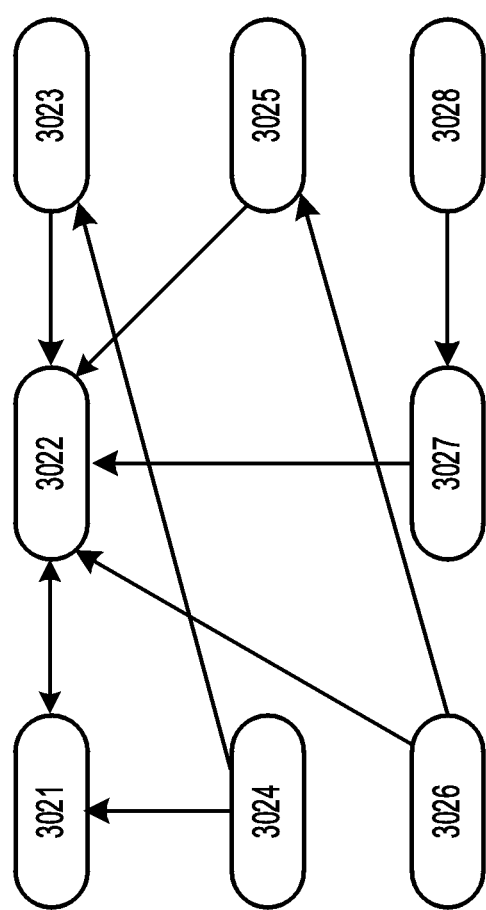
FIG. 5 depicts a schematic of a process for determination of linkage between each pair of fragments from the set of fragments in accordance with non-limiting embodiments of the present technology.

FIG. 5 depicts a schematic representation of the linkage between fragments 3021-3028 of the digital document 302. In the context of the non-limiting embodiments of the present technology, the terms "fragment interrelationship," "fragment linkage," "fragment link" are understood to mean the comprehensibility to the user of one fragment subject to the exclusion of another fragment. Thus, in the context of FIG. 5, a one-way arrow is used to indicate that the fragment from which the arrow originates is linked (incomprehensible without) the fragment to which the arrow is pointing. A two-way arrow is used to indicate that the fragments are incomprehensible without one another, that is, that interlinkage exists between them. The absence of arrows between fragments indicates the lack of linkage, that is, that the fragments are comprehensible to the user when taken separately. The links between every two fragments from the set of fragments can be determined by means of the pre-trained third machine-learning algorithm. The existence of linkage between fragments can be influenced, for example, by the first and repeated mention of a term in a single fragment, while the less frequent mention of that term in another fragment could indicate, for instance, that one fragment provides a detailed description of the term, and consequently that the other fragment may be linked to it (incomprehensible without it).

As shown in FIG. 5, there is interlinkage between the first fragment 3021 and the second fragment 3022. In some non-limiting embodiments of the present technology, in response to the receipt of an indication of the interlinkage between the first 3021 and the second 3022 fragments, the first 3021 and the second 3022 fragments are converged into single fragment 3030 as shown in FIG. 3.

In some non-limiting embodiments of the present technology, the determination of linkage between each pair of fragments is performed simultaneously with the segmentation of the digital content into an ordered set of fragments.

In some non-limiting embodiments of the present technology, at the step of determining the linkage between each pair of fragments from the set of fragments, the linkage between at least one pair of fragments from the set of the digital content fragments is scored by an assessor; that said, the score received from the assessor is applied as an additional input parameter of the third machine-learning algorithm.

In some non-limiting embodiments of the present technology, the indication of linkage between every two fragments from the set of fragments comprises at least one of: a parameter indicating the existence of linkage or interlinkage between the first and second fragments and a parameter indicating the degree of linkage or interlinkage between the first and second fragments. Thus, for example, the second fragment 3022 would be incomprehensible without the first fragment 3021 to 60% of all users. Consequently, in this example, the degree of interlinkage would amount to 60%. For the remaining 40%, the second fragment 3022 could be comprehensible without the first fragment 3021. As an illustrated example, in the case of the video lecture, the second fragment 3022 could be incomprehensible to the majority of listeners without the background information given in the first fragment 3021. To many others familiar with the information from the first fragment 3021, the second fragment 3022 could be comprehensible without the first fragment 3021.

In some non-limiting embodiments of the present technology, the indication of interlinkage is a parameter indicating the degree of linkage or interlinkage between fragments; that said, prior to the verification of linkage between each pair of fragments from the subset of fragments, a threshold value is given for the parameter indicating the degree of linkage or interlinkage between fragments. For example, in cases where the digital-content summary is intended for the advanced user, the threshold value of the linkage/interlinkage parameter may be increased relative to the threshold value of the linkage/interlinkage parameter in a digital-content summary intended for a wider audience (for less-advanced users). Returning to the example of the digital document 302—a video lecture, the summary of the digital document 302 could be intended for students and schoolchildren. Alternately, the summary of the digital document 302 could be intended for more advanced users, such as scientists familiar with the background information from the first fragment 3021, in which case the second fragment 3022 would be comprehensible to such users without the first fragment 3021.

In some non-limiting embodiments of the present technology, the request for the generation of summarized digital content includes an indication of the degree of proficiency in the digital-content subject matter. For example, the user 150 can set the degree of proficiency in the subject matter of the digital document 302, for which the summary must be generated. Degree of proficiency can have a binary value: "beginner" and "advanced." Alternatively, the nominal degree of proficiency in a given subject matter could be scored differently, such as on a 1-5-point scale, or otherwise.

In some non-limiting embodiments of the present technology, at the step of determining the linkage between fragments, the received value of the degree of proficiency in digital-content subject matter is used as an input parameter. In view of the nominal proficiency score in the subject matter of the digital document 302 received from user 150, the significance of linkage between fragments or degree of linkage between fragments may be adjusted. For example, digital document 302 is a movie; that said, user 150 has read the book on which the movie is based and has selected "advanced" as their degree of proficiency in the given subject matter. That said, some of the digital content fragments that don't have high utility but which are linked to the most useful fragments may be excluded from the summary of the digital document 302, insofar as user 150 is quite familiar with the subject matter of the digital document 302 and therefore able to comprehend some fragments with a utility parameter above the threshold value that are linked with other fragments with a utility parameter below the threshold value. That is, the "advanced" user 150 can fill in linkage and comprehend, for example, second fragment 3022 without first fragment 3021, while at the same time the "beginner" user cannot fill in linkage and consequently cannot understand second fragment 3022 without first fragment 3021. Thus, a balance may be achieved between the high utility and high linkage (comprehensibility) of the digital-content summary and the size of the digital-content summary with regard to specific user 150.

In some non-limiting embodiments of the present technology, the received value of the degree of proficiency in the subject matter of the digital content is used to determine the utility parameter of at least one fragment of the digital content. Thus, for example, one and the same fragment of the digital content could have high utility for a "beginner" user but low utility for an "advanced" user.

Then, the method continues to step 214.

Step 214—in Response to the Utility Parameter of the Second Fragment Exceeding a Pre-Determined Threshold Value of the Utility Parameter, Including the Second Fragment in a Subset of Fragments for Inclusion in the Summary of the Digital Content At step 214, the processor 104 of the computer-device 102 generates a subset of fragments encompassing fragments whose utility parameter exceeds the pre-defined threshold value.

Figure 4:
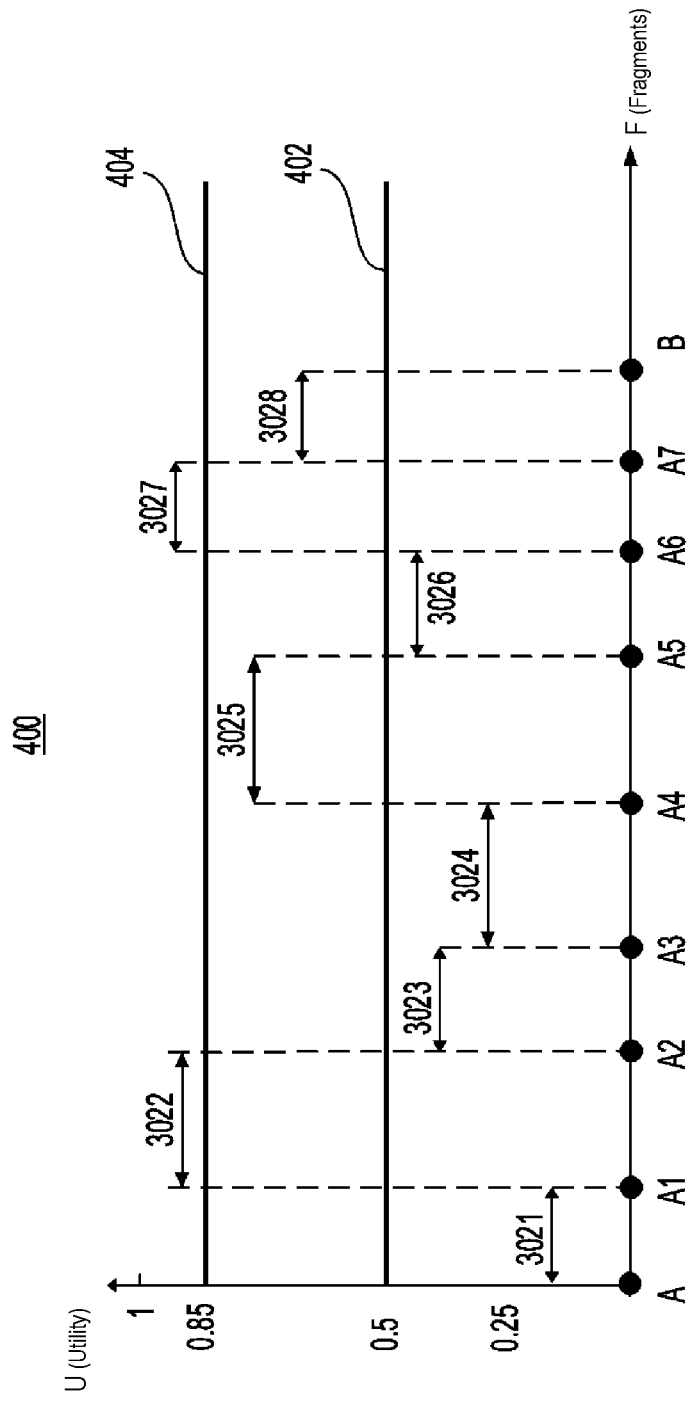
FIG. 4 depicts a schematic of a process for determination of a utility parameter for each fragment from the set of fragments in accordance with non-limiting embodiments of the present technology.

FIG. 4 shows utility threshold value 402, which is illustrated at 0.5. Consequently, all fragments whose utility parameter exceeds threshold value 402 are included in the subset of fragments for inclusion in the summary of the digital document 302.

In some non-limiting embodiments of the present technology, prior to defining the utility parameter for each fragment from the set of fragments, at least one additional threshold value 404 is given for the utility parameter; at least one additional subset of fragments is generated to serve as the basis for the generation of at least one additional digital content summary.

In some non-limiting embodiments of the present technology, at least one additional summary of the digital content is distinguished in terms of size from the summarized digital content.

Then, the method continues to step 216.

Step 216—in Response to the Linkage Having been Determined Between the Second Fragment and the First Fragment, Including the First Fragment in the Subset of Fragments At step 216, in response to the receipt of an indication of linkage between the second fragment 3022 and the first fragment 3021, the first fragment 3021 is included in the subset of fragments.

In the illustrated example provided, the utility parameter of first fragment 3021 does not exceed the pre-defined threshold value (402, 404). Despite this, it is included in the subset of fragments for inclusion in the summary of the digital document 302.

Then, the method continues to step 218.

Figure 6:
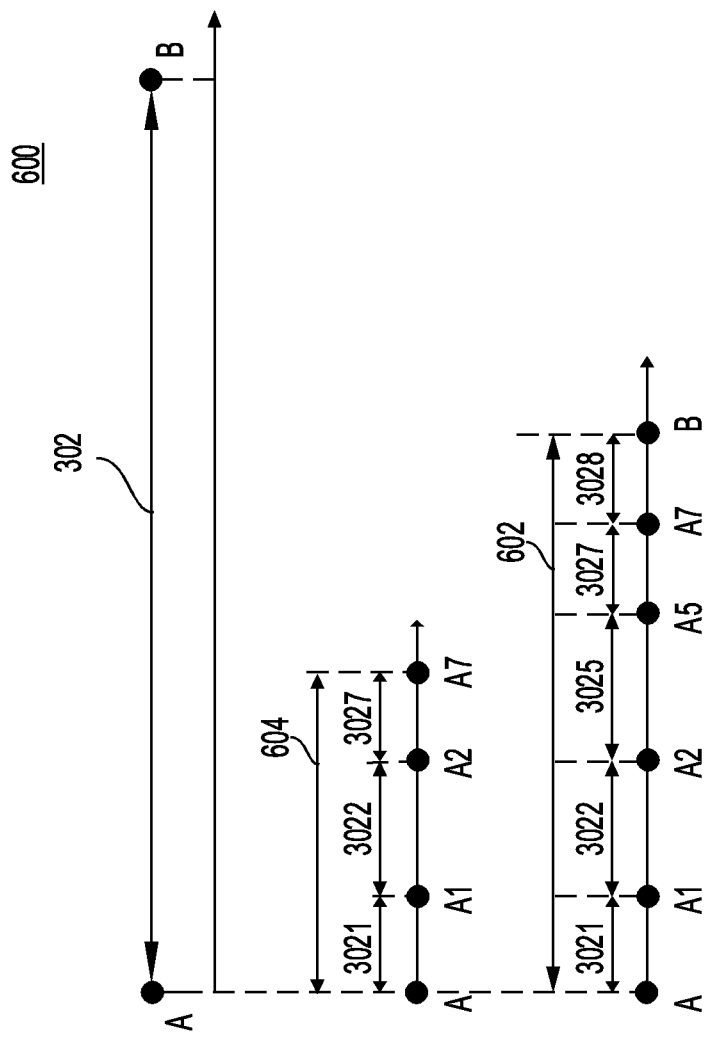
FIG. 6 depicts a schematic of a process for generation of summarized digital content based on the subset of fragments in accordance with non-limiting embodiments of the present technology.

Step 218—Generating the Summary of the Digital Content Based on the Subset of Fragments With reference to FIG. 6, at step 218, a summary 602 of the digital document 302 is generated on the basis of the subset of fragments, including the first fragment 3021, the second fragment 3022, the fifth fragment 3025, the seventh fragment 3027 and the eighth fragment 3028.

In some non-limiting embodiments of the present technology, prior to defining the utility parameter for each fragment from the set of fragments, at least one additional threshold value 404 is given for the utility parameter; at step 218, entailing the generation of a subset of fragments, at least one additional subset of fragments is generated to serve as the basis for the generation of at least one additional summary 604 of the digital content. The additional summary 604 of the digital content, according to the illustrated example shown in FIG. 6, encompasses the first fragment 3021, the second fragment 3022 and the seventh fragment 3027.

The digital content additional summary 604 is distinct in terms of size from digital content summary 602, insofar as the additional threshold value of utility parameter 404 exceeds threshold value 402 of the utility parameter, and consequently, fewer fragments were included in the additional subset of fragments for the generation of additional summary 604 of the digital document 302.

It should be noted that the first fragment 3021 was included in summary 602 of the digital document 302 and digital content additional summary 604, despite the fact that the utility parameter of first fragment 3021 does not exceed threshold value 402 of the utility parameter and the additional threshold value of utility parameter 404. This is predicated on the fact that there is interlinkage between the second fragment 3022 and the first fragment 3022.

Following the generation of the digital content summaries 602 and 604, they can be stored, in particular, on the digital content source server 130, or on computer-device 102, or sent to client device 140.

After step 218, method 200 can terminate.

The relay and receipt of various signals, including tasks and queries, is well known in this technical field and thus, for the purposes of simplification, has been omitted in specific sections of this description. Signals can be relayed and received with the aid of optical means (such as fiberoptic connection), electronic means (such as wired or wireless connection) and mechanical means (such as on the basis of pressure, temperature or other suitable parameter).

Modifications and refinements to the above-described variants for the implementation of the present technology will be clear to specialists in this technical field. The preceding description is provided solely as an example and implies no particular limitations. Thus, the scope of the present technology is limited solely by the scope of the appended claim.

The invention claimed is:

1. A method for generating a summary of digital content, the method implementable by a processor of a computer-device, the method comprising:
   receiving an indication of the digital content;
   executing a syntax analysis of a textual representation of the digital content;
   segmenting the digital content into an ordered set of fragments, including a first fragment and a second fragment;
   executing a semantic analysis of each fragment of the textual representation of the digital content;
   determining a utility parameter for each fragment of the set of fragments, the utility parameter being indicative of a predicted level of interest for a given user;
   determining a linkage between each pair of fragments of the set of fragments, the linkage of the second fragment paired with the first fragment being indicative of a comprehensibility of the second fragment without the first fragment to the user;
   in response to the utility parameter of the second fragment exceeding a pre-determined threshold value of the utility parameter, including the second fragment in a subset of fragments for inclusion in the summary of the digital content;
   in response to the linkage having been determined between the second fragment and the first fragment, including the first fragment in the subset of fragments;
   generating the summary of the digital content based on the subset of fragments.

2. The method of claim 1, wherein the segmenting of the digital content into an ordered set of fragments comprises executing a pre-trained first machine-learning algorithm.

3. The method of claim 2, further comprising pre-training the first machine-learning algorithm, the first machine-learning algorithm for segmenting the digital content into the set of fragments, an output of the syntax analysis of the textual representation of the digital content being used as input parameters of the first machine-learning algorithm, and wherein training of the first machine-learning algorithm comprises training using a training sample set.

4. The method of claim 1, wherein the determining the utility parameter of each fragment of the set of fragments comprises applying a pre-trained second machine-learning algorithm.

5. The method of claim 4, further comprising pre-training the second machine-learning algorithm, the second machine-learning algorithm for determining the utility parameter of each fragment of the set of fragments; an output of the semantic analysis of the textual representation of the digital content being used as input parameters of the second machine-learning algorithm, and wherein training of the second machine-learning algorithm comprises training using a training sample set.

6. The method of claim 1, wherein the indication of linkage between every two fragments of the set of fragments comprises one of: a parameter indicating an existence of linkage between each two fragments and a parameter indicating a degree of linkage between each two fragments.

7. The method of claim 1, wherein the determining the linkage between each pair of fragments from the set of fragments comprises applying a pre-trained third machine-learning algorithm.

8. The method of claim 7, further comprising training the third machine-learning algorithm, the third machine-learning algorithm for determining the linkage between each pair of fragments from the set of fragments; an output of the semantic and syntax analysis of the textual representation of the digital content being used as input parameters of the third machine-learning algorithm, and the training of the third machine-learning algorithm comprises training using a training sample set.

9. The method of claim 8, wherein, the determining the linkage between each pair of fragments from the set of fragments, the method further comprising scoring the linkage between at least one pair of fragments from the set of fragments by an assessor; and wherein the method further comprises using an assessor-score as an additional input parameter of the third machine-learning algorithm.

10. The method of claim 1, wherein the determining the linkage between each pair of fragments is performed simultaneously with the segmenting the digital content into an ordered set of fragments.

11. The method of claim 1, wherein the utility parameter of the first fragment does not exceed the predefined threshold value.

12. The method of claim 1, wherein prior to the defining the utility parameter for each fragment from the set of fragments, the method further comprises determining at least one additional threshold value for the utility parameter; and the method further comprises generating at least one additional summary of the digital content based on at least one additional subset of fragments.

13. The method of claim 1, wherein prior to the segmenting the digital content, the method further comprises receiving a request for the generation of summarized digital content.

14. The method of claim 13, wherein, in response to the receiving the request for the generation of the digital content, the method further comprises transmitting, to an assessor, at least one reference to a fragment of the digital content for the scoring of its utility parameter; and wherein the determining the utility parameter for each fragment of the set of fragments, the method further comprises using the assessor-generated utility-parameter score for at least one of the fragments as an additional input parameter.

15. The method of claim 13, wherein the request for the generation of summarized digital content includes the threshold value of the utility parameter of digital-content fragments for inclusion in the summary of the digital content.

16. The method of claim 13, wherein the request for the generation of summarized digital content includes an indication of the degree of proficiency in the digital-content subject matter.

17. The method of claim 16, wherein the determining the linkage between fragments, the method further comprises using the indication of the degree of proficiency in digital-content subject matter as an input parameter.

18. The method of claim 1, wherein the digital content comprises an audio file, and wherein the segmenting the audio file into fragments and the generating indications of linkage between fragments, the method further comprises preforming an analysis of at least one of: intonation, musical accompaniment, voice timbre, voice tempo, voice tone, and pauses.

19. The method of claim 1, wherein the digital content comprises a video file, and wherein the segmenting the video file into fragments and the determining the linkage between fragments, the method further comprises performing an analysis of an audio based on at least one: intonation, musical accompaniment, voice timbre, voice tempo, voice tone, pauses, and an analysis of a video based on at least one of: background, scene, and color.

20. A computer-device for the generation of a summary of a digital content, the computer-device comprising:
   a processor,
   a communications interface,
   the processor functionally coupled to:
      a digital content receipt module,
      a digital content segmentation module,
      a utility parameter determination module, and
      a fragments linkage determination module;
   the processor being configured to:
      receive an indication of the digital content;
      execute a syntax analysis of a textual representation of the digital content;
      segment the digital content into an ordered set of fragments, including a first fragment and a second fragment;
      execute a semantic analysis of each fragment of the textual representation of the digital content;
      determine a utility parameter for each fragment of the set of fragments, the utility parameter being indicative of a predicted level of interest for a given user;
      determine a linkage between each pair of fragments of the set of fragments, the linkage of the second fragment paired with the first fragment being indicative of a comprehensibility of the second fragment without the first fragment to the user;
      in response to the utility parameter of the second fragment exceeding a pre-determined threshold value of the utility parameter, include the second fragment in a subset of fragments for inclusion in the summary of the digital content;
      in response to the linkage having been determined between the second fragment and the first fragment, include the first fragment in the subset of fragments;
      generate the summary of the digital content based on the subset of fragments.

* * * * *